United States Patent
Tatara et al.

(10) Patent No.: US 9,669,754 B2
(45) Date of Patent: Jun. 6, 2017

(54) TURN SIGNAL LAMP

(71) Applicant: Koito Manufacturing Co., Ltd., Tokyo (JP)

(72) Inventors: Naoki Tatara, Shizuoka (JP); Toshihiro Okamura, Shizuoka (JP); Kenji Nobuhara, Shizuoka (JP); Hiroya Koizumi, Shizuoka (JP); Kazuyuki Ishikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 14/982,064

(22) Filed: Dec. 29, 2015

(65) Prior Publication Data
US 2016/0207444 A1 Jul. 21, 2016

(30) Foreign Application Priority Data
Jan. 16, 2015 (JP) .................................. 2015-006625

(51) Int. Cl.
| | |
|---|---|
| *B60Q 1/00* | (2006.01) |
| *F21S 8/10* | (2006.01) |
| *B60Q 1/38* | (2006.01) |
| *B60R 1/00* | (2006.01) |
| *B60R 11/04* | (2006.01) |

(52) U.S. Cl.
CPC ............. *B60Q 1/0023* (2013.01); *B60Q 1/38* (2013.01); *B60R 1/00* (2013.01); *B60R 11/04* (2013.01); *F21S 48/215* (2013.01); *F21S 48/225* (2013.01); *B60R 2300/105* (2013.01)

(58) Field of Classification Search
CPC ...... B60Q 1/0023; B60Q 1/38; B60Q 1/0425; B60R 1/1207; B60R 11/04; B60R 2300/105; F21S 48/215; F21S 48/22; F21S 48/225; F21S 48/236
See application file for complete search history.

(56) References Cited

U.S. PATENT DOCUMENTS

| | | | |
|---|---|---|---|
| 8,491,170 B2* | 7/2013 | Rodriguez Barros | B60Q 1/2665 362/494 |
| 8,752,990 B2* | 6/2014 | Okada | F21S 48/215 362/507 |
| 2008/0089080 A1* | 4/2008 | Kawaji | B60Q 1/2665 362/494 |
| 2010/0053986 A1* | 3/2010 | Ishikawa | B60R 1/1207 362/509 |
| 2013/0083550 A1* | 4/2013 | Ishigami | B60Q 3/023 362/511 |

FOREIGN PATENT DOCUMENTS

JP 2003-312359 11/2003

* cited by examiner

*Primary Examiner* — Hargobind S Sawhney
(74) *Attorney, Agent, or Firm* — Abelman, Frayne & Schwab

(57) ABSTRACT

Provided is a turn signal lamp including a light source, a light guide, and a camera having an image capture device, which are installed within a lamp chamber formed by a lamp body and an outer cover. At least a portion of the light guide is formed in an area that extends from the camera in a direction following a vehicle surface.

7 Claims, 13 Drawing Sheets

TURN SIGNAL LAMP

CROSS-REFERENCE TO RELATED APPLICATIONS

This application is based on and claims priority from Japanese Patent Application No. 2015-006625 filed on Jan. 16, 2015, with the Japan Patent Office, the disclosure of which is incorporated herein in its entirety by reference.

TECHNICAL FIELD

The present disclosure relates to a turn signal lamp.

BACKGROUND

As disclosed in Japanese Patent Laid-Open Publication No. 2003-312359a turn signal lamp has been proposed in which a side mirror is abolished and a camera capable of acquiring a backward image of a vehicle is equipped in place of the turn signal lamp.

Inventors have contemplated improving the visibility of such a turn signal lamp by equipping a light guide in the turn signal lamp. However, when the camera and the light guide are equipped in the turn signal lamp, the turn signal lamp is increased in size so that the aerodynamic drag of the vehicle may increase.

Therefore, an object of the present disclosure is to provide a turn signal lamp which includes a camera and a light guide and is capable of suppressing the increase of aerodynamic drag.

In accordance with the present disclosure, a turn signal lamp includes: a lamp body; an outer cover that forms a lamp chamber with the lamp body; a light source installed within the lamp chamber; a light guide installed within the lamp chamber to guide light emitted from the light source; and a camera installed within the lamp chamber and provided with an image capture device. When the turn signal lamp is attached to a vehicle surface, at least a portion of the light guide is provided in an area that extends from the camera in a direction following the vehicle surface.

In a case where a turn signal lamp is mounted on a vehicle, and the turn signal lamp largely protrudes from the vehicle surface, the aerodynamic drag of the vehicle increases, or the design property of the vehicle is damaged. However, it has been found that, even if the turn signal lamp is somewhat enlarged in a direction following a vehicle surface, the turn signal lamp may hardly protrude from the vehicle surface so that the aerodynamic drag may be hardly increased. In addition, the turn signal lamp may hardly damage the design property of the vehicle.

When a member of the turn signal lamp is arranged in the area that extends from the camera in the direction following the vehicle surface, the turn signal lamp may hardly be increased in size in a direction in which the turn signal lamp protrudes from the vehicle surface. Therefore, the increase of aerodynamic drag by the turn signal lamp may be suppressed by arranging the light guide in the area that extends from the camera in the direction following the vehicle surface.

In the turn signal lamp, the light guide may include: a thick portion, at least a portion of which is formed in an area that extends from the camera in the direction following the vehicle surface as well as in at least one of an upward direction and a downward direction when the turn signal lamp is attached to the vehicle; and a thin portion, at least a portion of which is formed in an area that extends from the camera in a front-and-back direction. The thin portion is thinner than the thick portion.

Since the large light guide having the thick portion and the thin portion may be located in the lamp chamber using the area that extends from the camera in the direction following the vehicle surface and in at least one of the upward direction and the downward direction as well as an area that extends from the camera in the front-and-back direction, the visibility may be further improved while suppressing the enlargement of the turn signal lamp in the direction in which the turn signal lamp protrudes from the vehicle surface.

In the turn signal lamp, the thick portion and the thin portion may be integrally formed with each other.

Since the thick portion and the thin portion may be brightened by a single light source, the enlargement of the turn signal lamp may be suppressed while improving the visibility.

The turn signal lamp may further include an extension installed in the lamp chamber, and configured to shield at least a portion of an inner surface of the lamp body, the light source, the light guide, or the camera from an outside. An image capture device cover portion may be provided on the extension to suppress light emitted from the light guide or the light source from being introduced into the image capture device.

Since the light emitted from the light source does not directly or indirectly enter the image capture device, image information may be acquired well.

In the turn signal lamp, the extension may integrally include a camera cover portion that shields the camera excluding the image capture device from the outside.

In the turn signal lamp, the extension may integrally include a light source cover portion that shields the light source from the outside.

With the present disclosure, there is provided a turn signal lamp which includes a camera and a light guide and suppresses the increase in aerodynamic drag.

The above-described summary is illustration purposes only and does not intend to limit in any ways. In addition to the illustrative embodiment, examples, and features described above, additional embodiment, example, and features will become apparent by referring to the drawings and the following detailed description.

DETAILED DESCRIPTION

In the following detailed description, reference is made to the accompanying drawing, which form a part hereof. The illustrative exemplary embodiments described in the detailed description, drawings, and claims are not meant to be limiting. Other exemplary embodiments may be utilized, and other changes may be made, without departing from the spirit or scope of the subject matter presented here.

Hereinafter, examples of exemplary embodiments of the turn signal lamp according to the present disclosure will be described with reference to the drawings.

First Exemplary Embodiment

Figure 1:
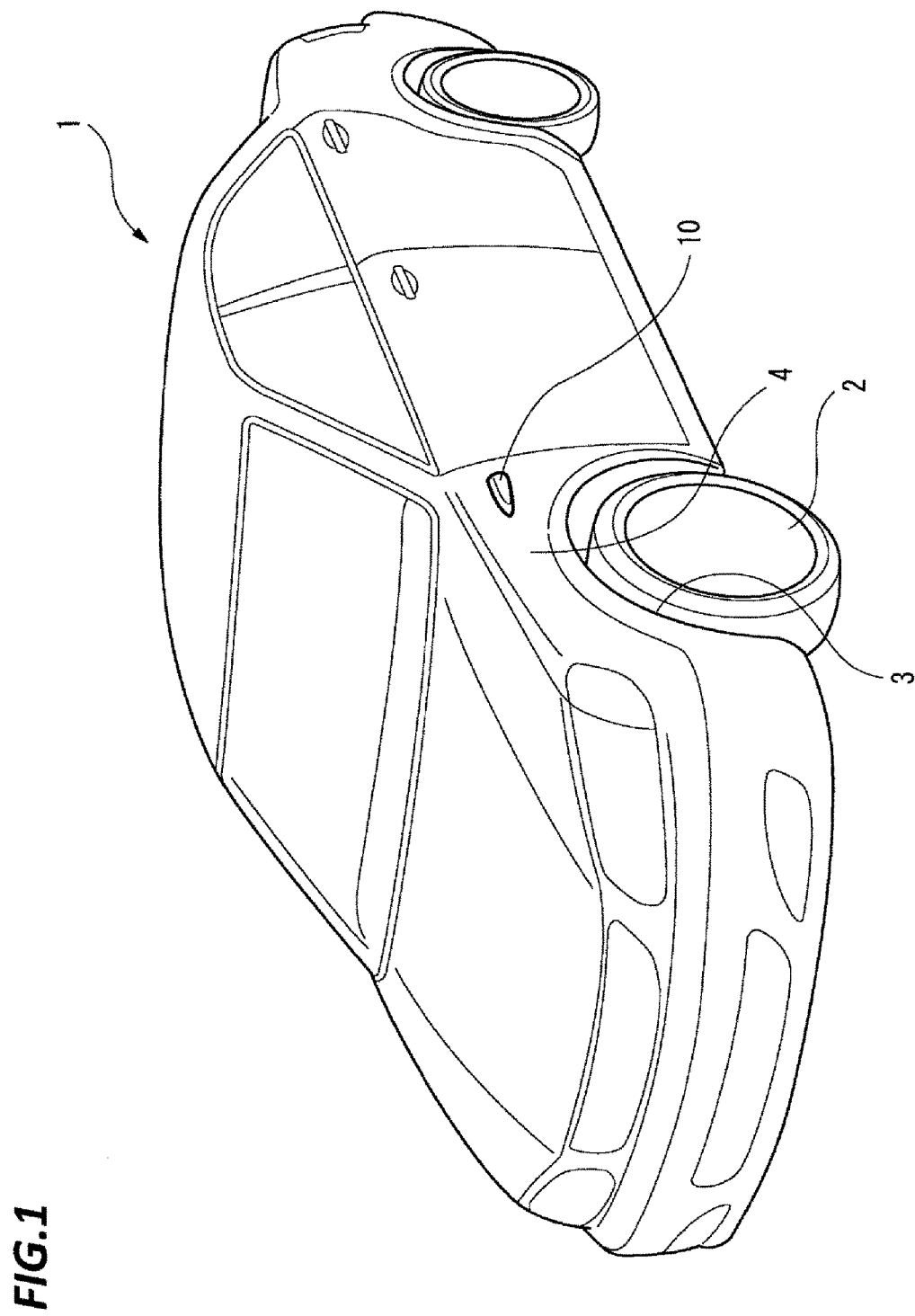
FIG. 1 is a perspective view illustrating a vehicle equipped with a turn signal lamp according to a first exemplary embodiment of the present disclosure.

FIG. 1 is a perspective view illustrating a vehicle 1 equipped with a turn signal lamp 10 according to the first exemplary embodiment of the present disclosure. As illustrated in FIG. 1, at least a portion of the turn signal lamp 10 is installed on a side surface of the vehicle body. The turn signal lamp 10 is installed on a front fender 4, which forms a tire house 3 for a front wheel 2. A pair of left and right turn signal lamps 10 are installed on a right side surface and a left side surface of the vehicle 1, respectively.

The vehicle 1 illustrated in FIG. 1 is not provided with a fender mirror or a door mirror. The function of observing the back side, which is taken by the fender mirror or the door mirror, is performed by a camera 50 equipped in the turn signal lamp 10 which will be described below. The right turn signal lamp, which is installed on the right side surface of the vehicle 1, includes a right camera therein. The left turn signal lamp, which is installed on the left side surface of the vehicle 1, includes a left camera therein. Each of the right camera and the left camera acquires image information regarding the back side of the vehicle 1.

Figure 2:
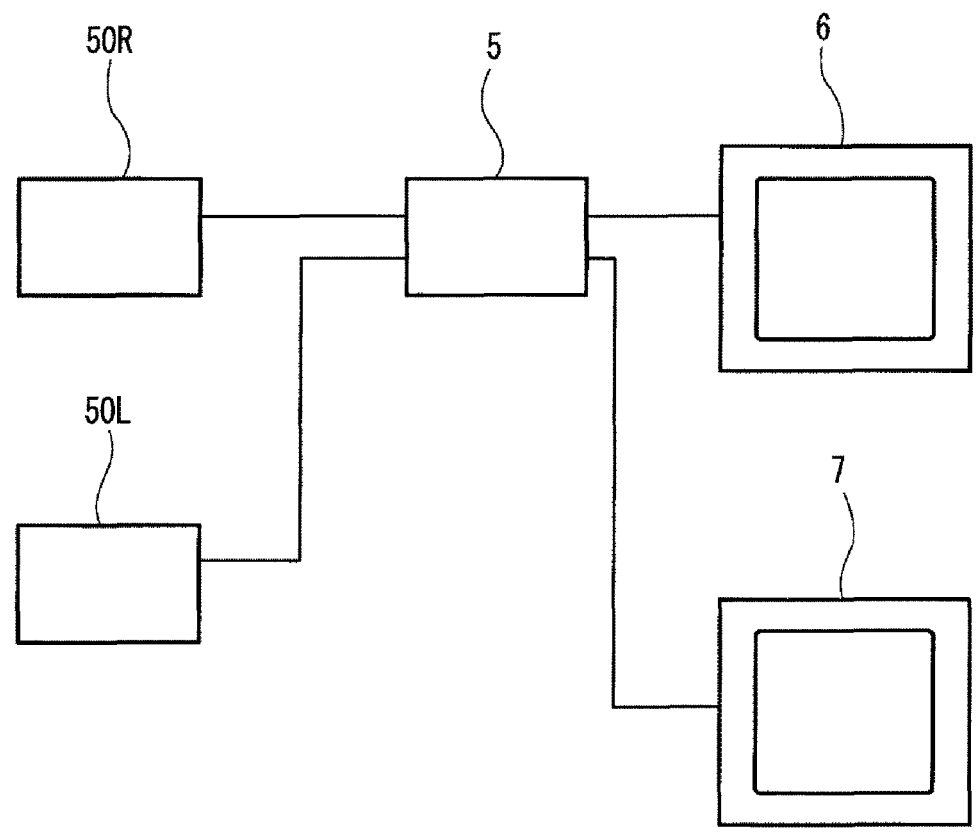
FIG. 2 is an operation block diagram illustrating a camera equipped in the turn signal lamp.

FIG. 2 is an operation block diagram of the right turn signal lamp and the left turn signal lamp. As illustrated in FIG. 2, the vehicle 1 includes an Electric Control Unit (ECU) 5 connected to a right camera SOR and a left camera SOL. The vehicle 1 includes a right camera monitor 6 and a left camera monitor 7, both of which are connected to the ECU 5 within a vehicle compartment.

Figure 3:
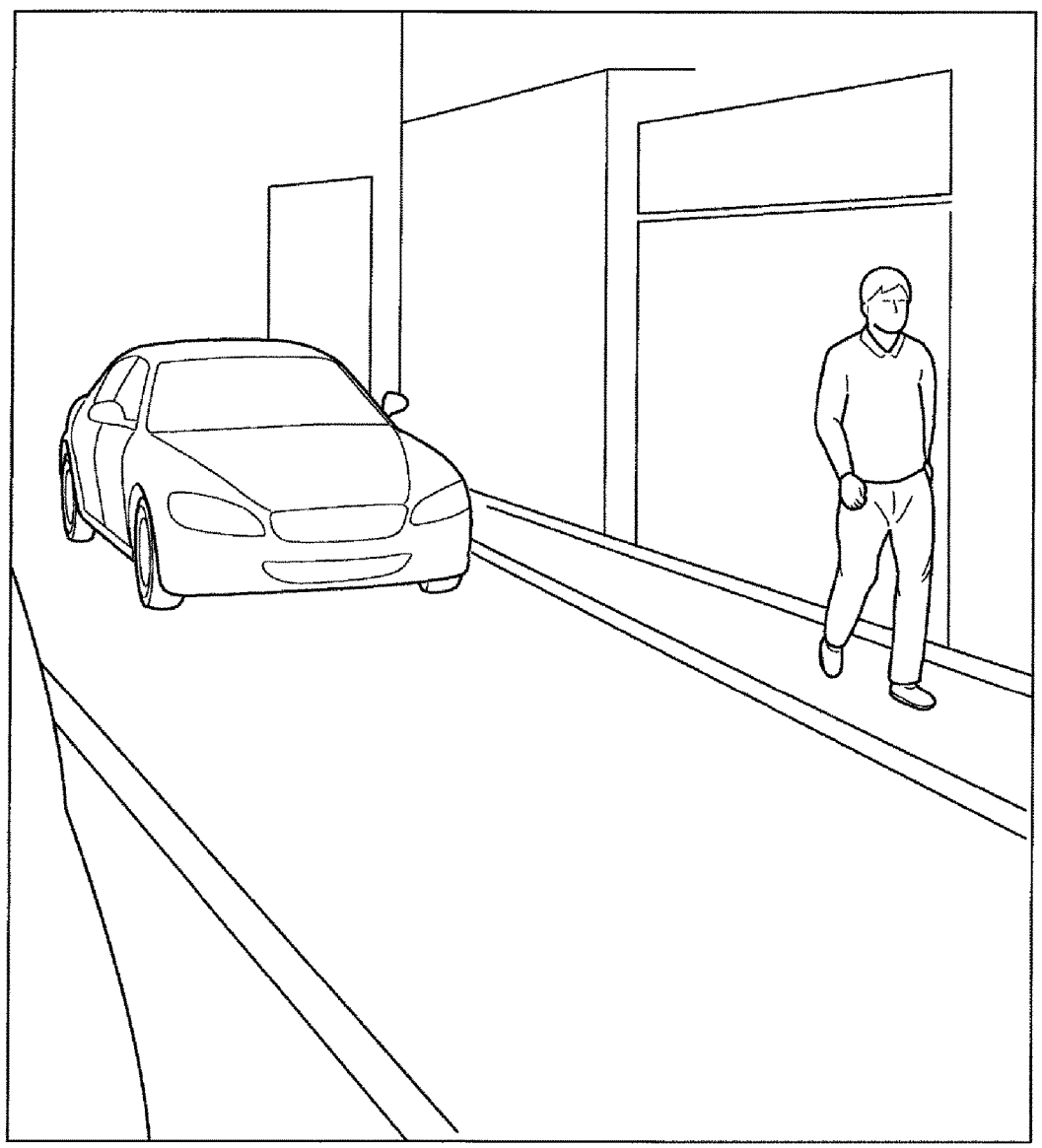
FIG. 3 is a view illustrating one example of an image displayed on a left camera monitor.

The right camera SOR and the left camera SOL transmit acquired image information to the ECU 5. The ECU 5 transmits the image information acquired from the right camera SOR to the right camera monitor 6. The right camera monitor 6 displays the image information acquired by the right camera 50R. The ECU 5 transmits the image information acquired from the left camera SOL to the left camera monitor 7. The left camera monitor 7 displays the image information acquired by the left camera SOL. For example, the left camera monitor 7 displays an image illustrated in FIG. 3.

Meanwhile, the right camera monitor 6 and the left camera monitor 7 may be monitors that are independent from each other. Alternatively, the right camera monitor 6 and the left camera monitor 7 may be a single common monitor, and the single monitor may be divided into left and right portions so as to allow the monitor to display the image from the right camera SOR and the image from the left camera SOL.

Next, the turn signal lamp 10 according to the first exemplary embodiment of the present disclosure will be described in detail.

Meanwhile, FIG. 4 to FIGS. 13A and 13B illustrate the right turn signal lamp. Since the left turn signal lamp and the right turn signal lamp have the same configuration, only the right turn signal lamp will be described. In the following description, the right turn signal lamp is simply referred to as the turn signal lamp 10 unless otherwise required. In addition, in the following description, an up-and-down direction, a left-and-right direction, and a front-and-back direction refer to directions in the case where the turn signal lamp 10 is viewed from the driver in a state where the turn signal lamp 10 is attached to the vehicle 1.

Figure 4:
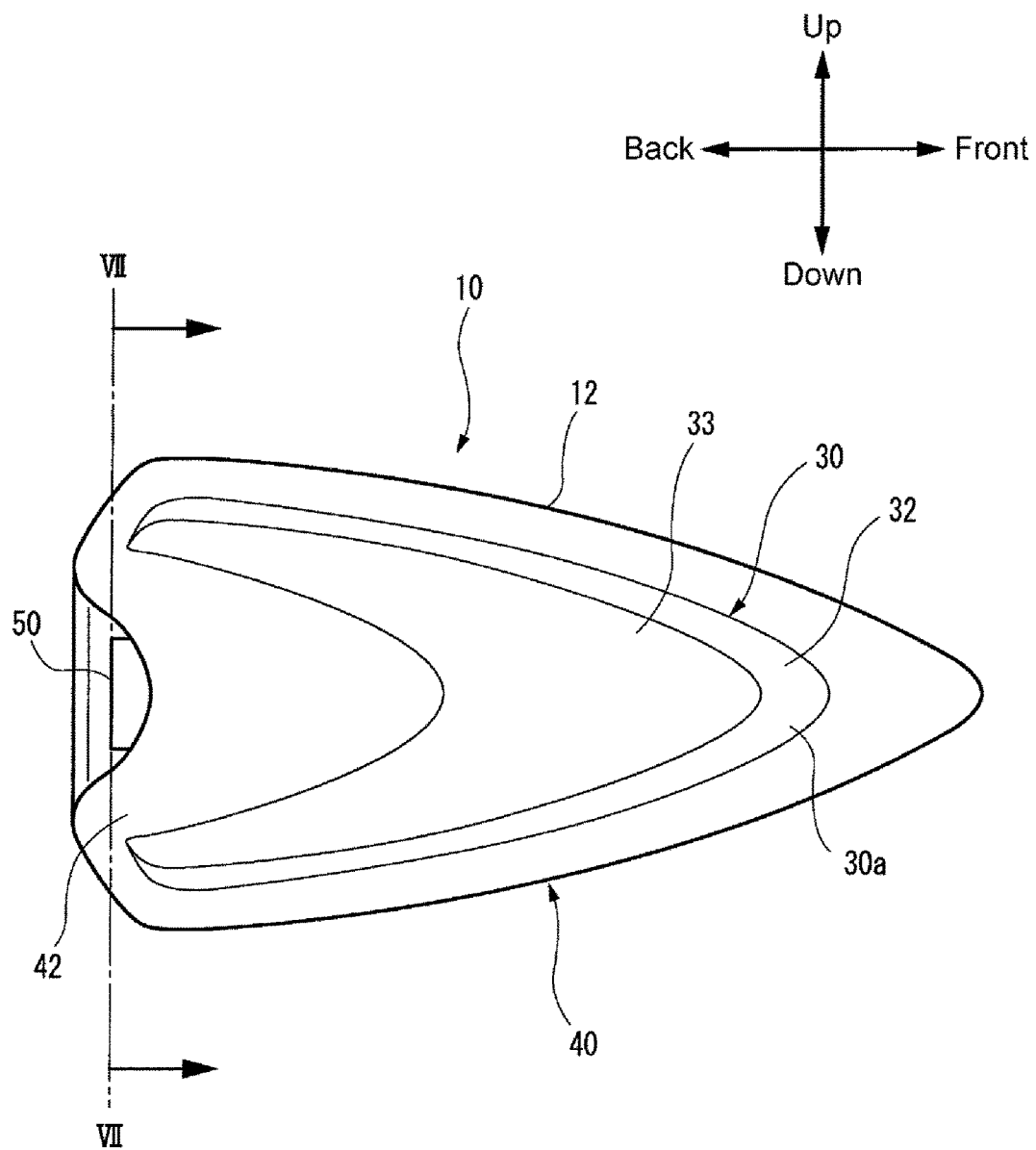
FIG. 4 is a side view illustrating the turn signal lamp according to the first exemplary embodiment of the present disclosure.
Figure 5:
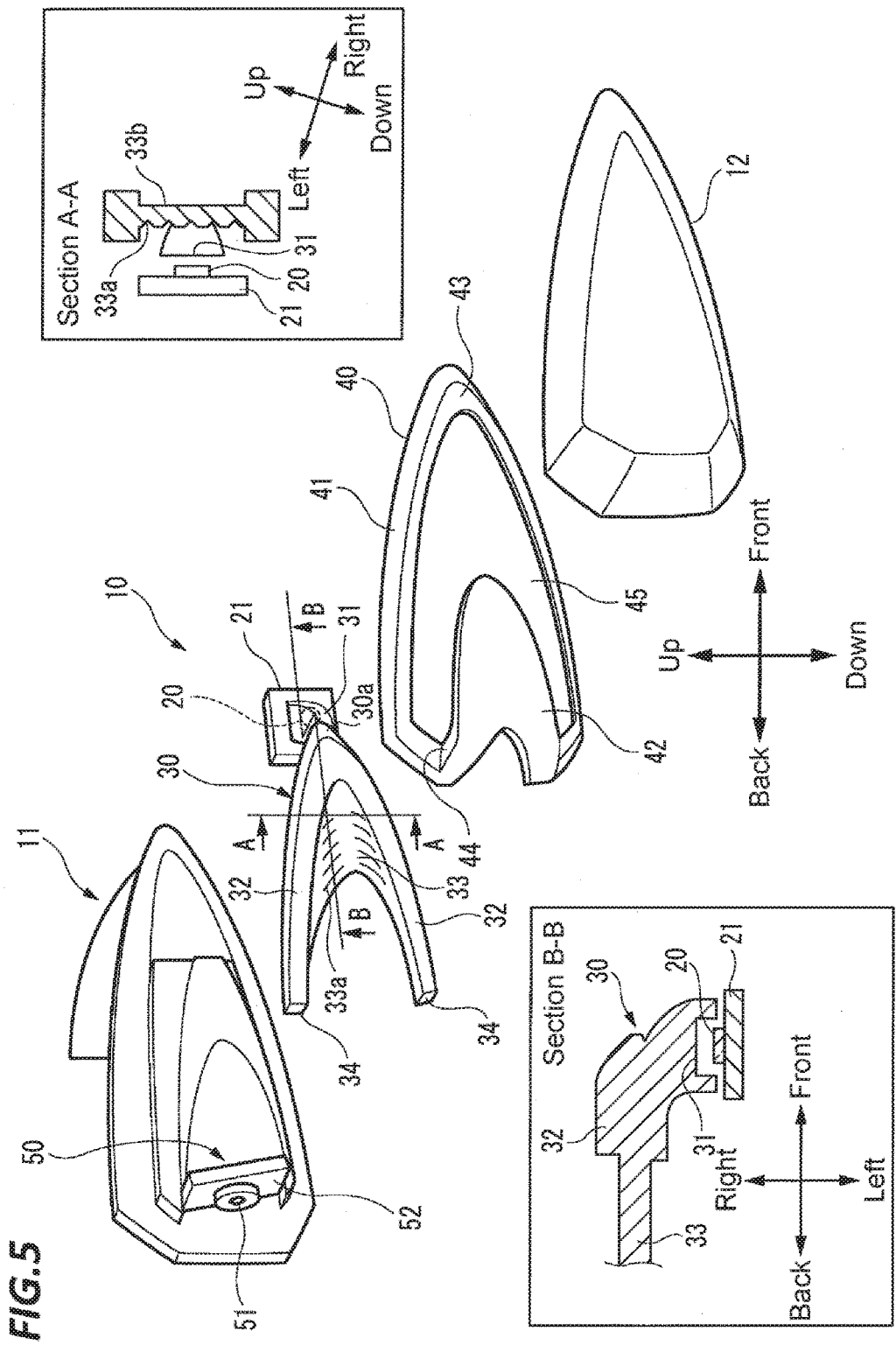
FIG. 5 is an exploded perspective view illustrating the turn signal lamp illustrated in FIG. 4.

FIG. 4 is a side view of the turn signal lamp 10 according to the first exemplary embodiment of the present disclosure. FIG. 5 is an exploded perspective view of the turn signal lamp 10 illustrated in FIG. 4. As illustrated in FIGS. 4 and 5, the turn signal lamp 10 includes a lamp body 11, an outer cover 12, a light emitting diode (LED) 20 (one example of a light source), a light guide 30, an extension 40, and a camera 50. A lamp chamber S (see FIG. 7) is formed by the lamp body 11 and the outer cover 12. The LED 20, the light guide 30, the extension 40, and the camera 50 are installed within the lamp chamber S.

The LED 20 is mounted on a mounting substrate 21. The LED 20 is attached to the lamp body 11 via the mounting substrate 21. While an example in which the LED 20 is employed as a light source has been described in the present exemplary embodiment, for example, a filament bulb, a discharge bulb, an organic electroluminescent (EL) device, or a laser diode (LD) may be employed as a light source, instead of the LED 20.

The light guide 30 is a transparent resin member that guides light emitted from the LED 20. The light guide 30 is a member having a 90°-rotated U shape in a side view. The light guide 30 is attached to the mounting substrate 21 of the LED 20 in an orientation where the bottom portion 30a of the letter U is directed to the front portion of the vehicle 1.

The light guide 30 includes an incidence portion 31, a main light guide portion 32 (one example of a thick portion), and a sub light guide portion 33 (one example of a thin portion) integrally. The incidence portion 31 is connected to the bottom portion 30a of the letter U, and covers the LED 20. The main light guide portion 32 forms a bifurcated shape that is split from the bottom portion 30a of the letter U into upper and lower portions along the outer edge of the letter U. Back end portions 34 of the light guide 30 are formed at back ends of the main light guide portion 32. Each back end portions 34 has a back end surface, the normal direction of which extends backward. The sub light guide portion 33 is formed between the upper portion of the main light guide portion 32 and the lower portion of the main light guide portion 32. The thickness of the sub light guide portion 33 in the left-and-right direction is smaller than the thickness of the main light guide portion 32 in the left-and-right direction.

Meanwhile, at least one of a slightly concave portion 33a or a slightly convex portion 33a may be formed on at least one of the surface of the sub light guide portion 33 at the outer cover 12 side and the surface of the outer cover 12 at the sub light guide portion 33 side. Light guided from the sub light guide portion 33 may be reflected to a lateral side of the vehicle by the slightly concave portion 33a or the slightly convex portion 33a. By this, the visibility of the turn signal lamp 10 from the lateral side of the vehicle may be improved.

Light emitted from the LED 20 is introduced into the incidence portion 31 of the light guide 30. Some of the light introduced into the incidence portion 31 is emitted from a surface of the main light guide portion 32, and the remainder is guided to the back end portions 34 to be emitted backward from the back end portions 34. A light distribution pattern prescribed by law is formed by the light emitted from the back end portions 34.

In addition, some of the light introduced into the incidence portion 31 is also guided to the sub light guide portion 33 to be emitted from the surface of the sub light guide portion 33.

As described above, the turn signal lamp 10 improves the visibility thereof by causing the main light guide portion 32 and the sub light guide portion 33 to emit light while forming the light distribution pattern prescribed by law by the light emitted from the back end portions 34.

In the present exemplary embodiment, the LED 20 emits white light. The light guide 30 is umber-colored. The outer cover 12 is colorless and transparent. When the LED 20 is turned on, the light guide 30 is tinged with umber, thereby functioning as the turn signal lamp 10.

The extension 40 is a member that shields at least a portion of a member disposed on an inner surface of the lamp body 11 or within the lamp chamber S from the outside. Meanwhile, the inner surface of the lamp body 11 refers to the surface at the side of forming the lamp chamber S. In the present exemplary embodiment, the member disposed within the lamp chamber S indicates at least one of the LED 20, the light guide 30, and the camera 50.

The extension 40 includes a frame portion 41 which has a shape following an outer edge of the lamp body 11, a camera cover portion 42 which covers the camera 50, a light source cover portion 43 which shields the LED 20 from the outside, and a light transmitting portion 45.

The front end of the camera cover portion 42 has a shape corresponding to the back end of the sub light guide portion 33 of the light guide 30. In this way, the extension 40 and the light guide 30 gives an impression of a single body, which improves a design characteristic.

The light source cover portion 43 covers the LED 20 from the outside of the incidence portion 31 of the light guide 30. By this, the light source cover portion 43 shields the emitting light state of the LED in the form of spots over the light guide 30, from the outside, thereby improving the appearance.

The light transmitting portion 45 transmits light directed from the surface of the main light guide portion 32 or the surface of the sub light guide portion 33 to the lateral side of the vehicle. The light transmitting portion 45 may be configured as an opening or a transparent area using a transparent material.

The camera 50 includes an image capture device 51, and a support substrate 52 that supports the image capture device 51. The camera 50 is attached to the lamp body 11 in an orientation where the image capture direction of the image capture device 51 is directed backward. The camera 50 is installed behind the LED 20. The camera 50 is back end installed between the upper portion of the main light guide portion 32 and the lower portion of the main guide portion 32 of the light guide 30. The image capture device 51 is located between the upper back end portion 34 and the lower back end portion 34 of the light guide 30. The image capture device 51 of the camera 50 is exposed backward from the back end of the camera cover portion 42.

Power feeding to the camera 50 is implemented by a power feed line (not illustrated) which extends, for example, from the ECU 5 (see, e.g., FIG. 2) of the vehicle. The camera 50 transmits image capture data to the ECU 5 through a communication line (not illustrated).

Figure 6:
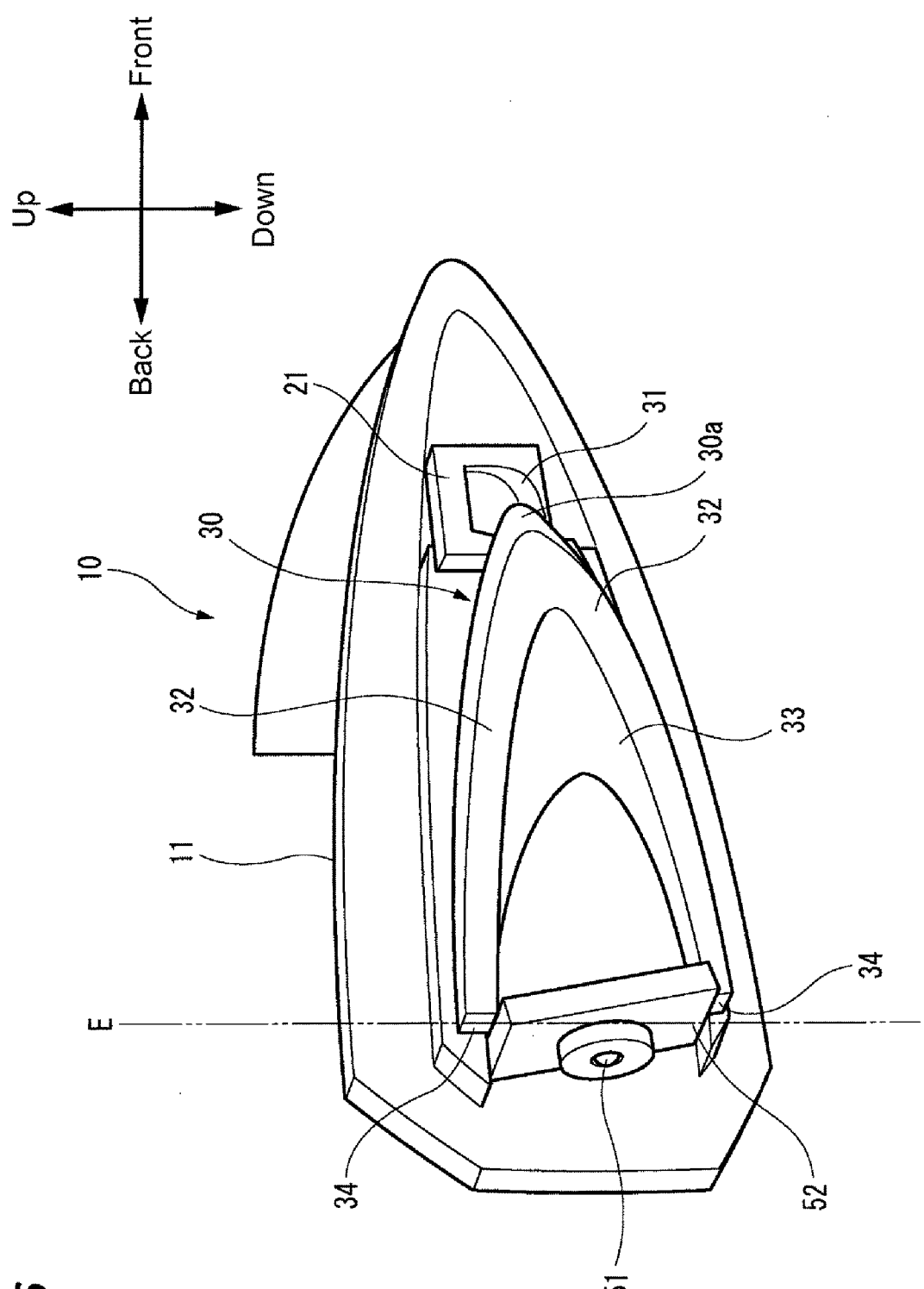
FIG. 6 is a perspective view illustrating the turn signal lamp illustrated in FIG. 4 in a state where an outer cover is removed therefrom.

FIG. 6 is a perspective view illustrating the turn signal lamp 10 illustrated in FIG. 4 in a state where the outer cover 12 is removed therefrom. As illustrated in FIG. 6, in the turn signal lamp 10 according to the present exemplary embodiment, the upper back end portion 34 of the light guide 30 is located behind the lower back end portion 34. A virtual line E is a virtual line extending in the vertical direction through the back end of the upper back end portion 34. The image capture device 51 of the camera 50 is located behind the virtual line E. That is, the image capture device 51 is located behind the back end portion 34 of the light guide 30. By this, the back end portions 34 of the light guide 30 are not included in a viewing angle of the image capture device 51 so that the image capture device 51 may acquire good image information.

Figure 7:
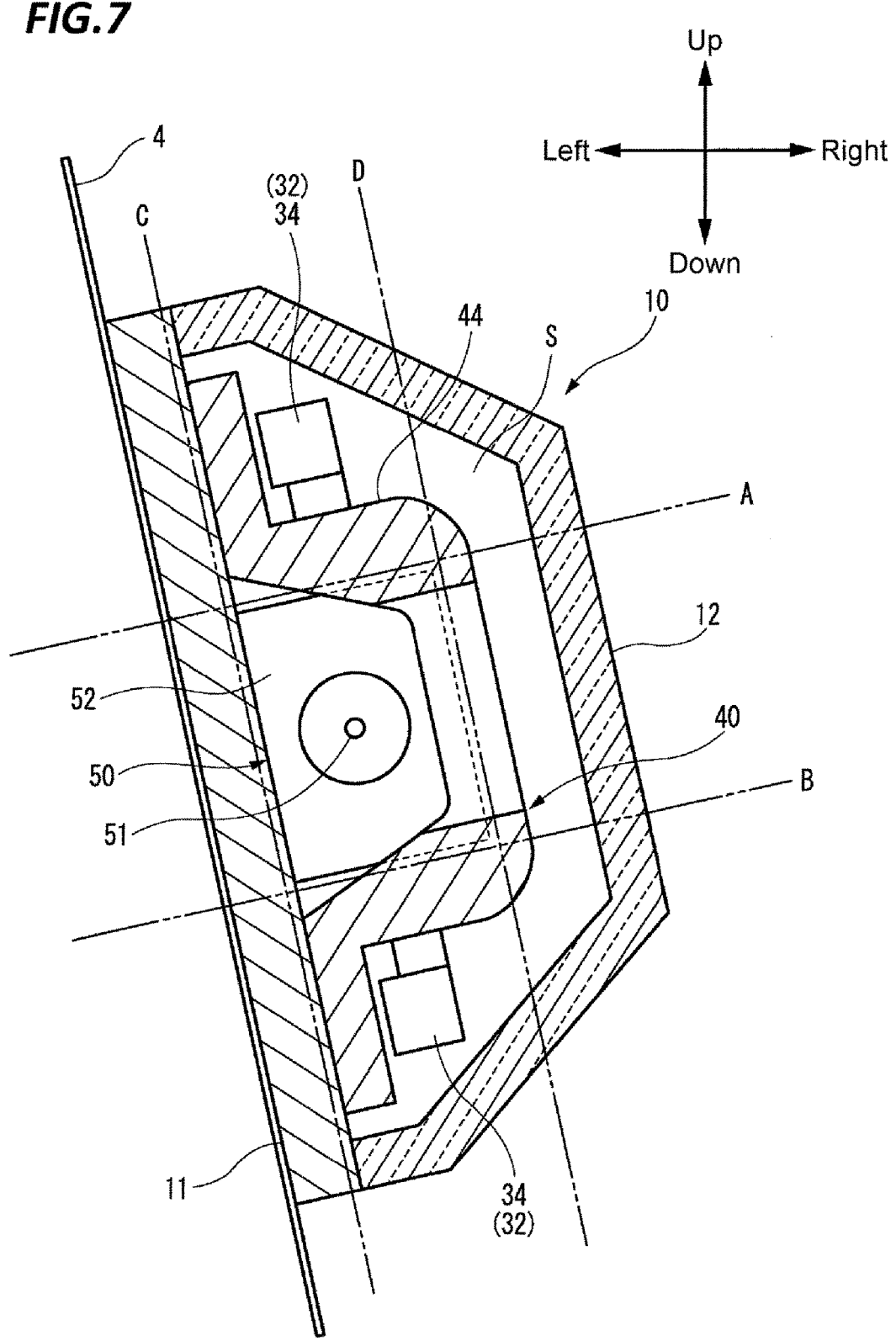
FIG. 7 is a sectional view taken along line VII-VII of FIG. 4.

FIG. 7 is a sectional view taken along line VII-VII of FIG. 4. As illustrated in FIG. 7, the extension 40 includes a pair of upper and lower image capture device cover portions 44, the normal of which extends in the up-and-down direction. The image capture device cover portions 44 are installed between the upper back end portion 34 of the light guide 30 and the image capture device 51 of the camera 50 and between the lower back end portion 34 of the light guide 30 and the image capture device 51 of the camera 50, respectively. The image capture device cover portions 44 block the light that is emitted from the back end portions 34 of the light guide 30 and introduced into the image capture device 51. By this, the image capture device 51 may acquire good image information.

<Acting Effect>

As illustrated in FIG. 7, in the present exemplary embodiment, the surface of the front fender 4 (one example of the vehicle surface), to which the turn signal lamps 10 are attached, is inclined in relation to the vertical direction. In FIG. 7, a virtual line C is a line extending a direction following the surface of the front fender 4 through the left end of the camera 50. A virtual line D is a line extending in the direction following the surface of the front fender 4 through the right end of the camera 50. A virtual line A is a line extending in a direction perpendicular to the virtual line C through the upper end of the camera 50. A virtual line B is a line extending in the direction perpendicular to the virtual line C through the lower end of the camera 50. The area between the virtual line C and the virtual line D is an area that extends from the camera 50 in the direction following the surface of the front fender 4. The area between the virtual line A and the virtual line B is an area that extends in a direction protruding from the surface of the front fender 4 due to the camera 50.

Meanwhile, the virtual lines A, B, C and D are lines that pass through the four corners of the support substrate 52 of the camera 50, respectively. In FIG. 7, however, the virtual lines A to D are drawn as if they do not pass through the four corners of the support substrate 52 of the camera 50 in order to make the figure easy to see.

As illustrated in FIG. 7, when the turn signal lamp 10 is attached to the vehicle 1, the upper back end portion 34 of the light guide 30 is formed in a space above the camera 50 between the virtual line C and the virtual line D, and the lower back end portion 34 of the light guide 30 is formed in a space below the camera 50 between the virtual line C and the virtual line D. That is, the upper and lower back end portions 34 of the light guide 30 are formed in an area that extends from the camera 50 in the direction following the surface of the front fender 4.

When the relatively large light guide 30 is installed within the lamp chamber S as in the turn signal lamp 10 according to the present exemplary embodiment, a light emitting area is increased, which may improve visibility. However, when the camera 50 is to be installed within the lamp chamber S in addition to the large light guide 30, the turn signal lamp 10 is likely to be enlarged in order to accommodate them. In a case where the turn signal lamp 10 is mounted in the vehicle 1, the aerodynamic drag of the vehicle 1 is increased or the design property of the vehicle is damaged when the turn signal lamp 10 protrudes far from the surface of the front fender 4.

However, the inventors of the present disclosure have found that the aerodynamic drag is hardly increased, and in addition, the design property of the vehicle 1 is hardly damaged, even if the turn signal lamp 10 is somewhat enlarged in the direction following the surface of the front fender 4. Thus, with the turn signal lamp 10 according to the present exemplary embodiment, the light guide 30 is arranged in the area that extends from the camera 50 in the direction following the surface of the front fender 4. When at least a portion of the light guide 30 is arranged in the area that extends from the camera 50 in the direction following the surface of the front fender 4, the turn signal lamp 10, which includes the camera 50 and the light guide 30, is hardly increased in size in the direction in which the turn signal lamp 10 protrudes from the surface of the front fender 4. Therefore, the turn signal lamp 10, which includes the large light guide 30 and the camera 50, has high visibility, and suppresses the increase of aerodynamic drag, is provided.

As illustrated in FIG. 6, in the turn signal lamp 10 according to the present exemplary embodiment, at least a portion of the main light guide portion 32 of the light guide 30 is formed in the area that extends from the camera 50 in the direction following the surface of the front fender 4 and also in at least one of the upward direction and the downward direction when the turn signal lamp 10 is attached to the vehicle 1. In addition, at least a portion of the sub light guide portion 33 of the light guide 30 is formed in the area that extends from the camera 50 in the front-and-back direction when the turn signal lamp 10 is attached to the vehicle 1.

That is, the large light guide 30, which includes the main light guide portion 32 and the sub light guide portion 33, is located within the lamp chamber S, using the area that extends from the camera 50 in the direction following the surface of the front fender 4 and also in at least one of the upward direction and the downward direction and the area that extends from the camera 50 in the front-and-back direction. Since no large part is present in any single area, it is possible to limit an increase in the overall size of the turn signal lamp 10. Therefore, through the use of the large light guide 30, visibility is further increased while the enlargement of the turn signal lamp 10 is suppressed in the direction where the turn signal lamp protrudes from the surface of the front fender 4. Meanwhile, "the area that extends from the camera 50 in at least one of the upward direction and the downward direction", mentioned herein, is a concept that includes an area that extends from the camera 50 in the vertical direction as well as an area that extends from the camera 50 in a direction having an acute angle of 0 to 30 degrees in relation to the vertical direction.

In addition, in the turn signal lamp 10 according to the present exemplary embodiment, the extension 40 includes the image capture device cover portions 44, which prevent light emitted from the back end portion 34 of the light guide 30, from being introduced into the image capture device 51 of the camera 50. The camera 50 may acquire good image information because light emitted from the LED 20 does not directly or indirectly enter the light emitting element 51, thanks to the image capture device cover portions 44.

In the turn signal lamp 10 according to the present exemplary embodiment, the main light guide portion 32 and the sub light guide portion 33 are integrally formed with each other. Therefore, the main light guide portion 32 and the sub light guide portion 33 may be brightened simultaneously by the single LED 20 so that the enlargement of the turn signal lamp 10 is suppressed while improving the visibility.

Meanwhile, for example, the shape of the light guide 30, the shape of the camera 50, or the relative positional relationship between the light guide 30 and the camera 50 are not limited to the above-described exemplary embodiment. Thus, turn signal lamps 10A to 10E according to second to sixth exemplary embodiments of the present disclosure will be described. The same components as those in the turn signal lamp 10 according to the first exemplary embodiment are designated by the same reference numerals, and the descriptions thereof will be omitted.

Second Exemplary Embodiment

Figure 8:
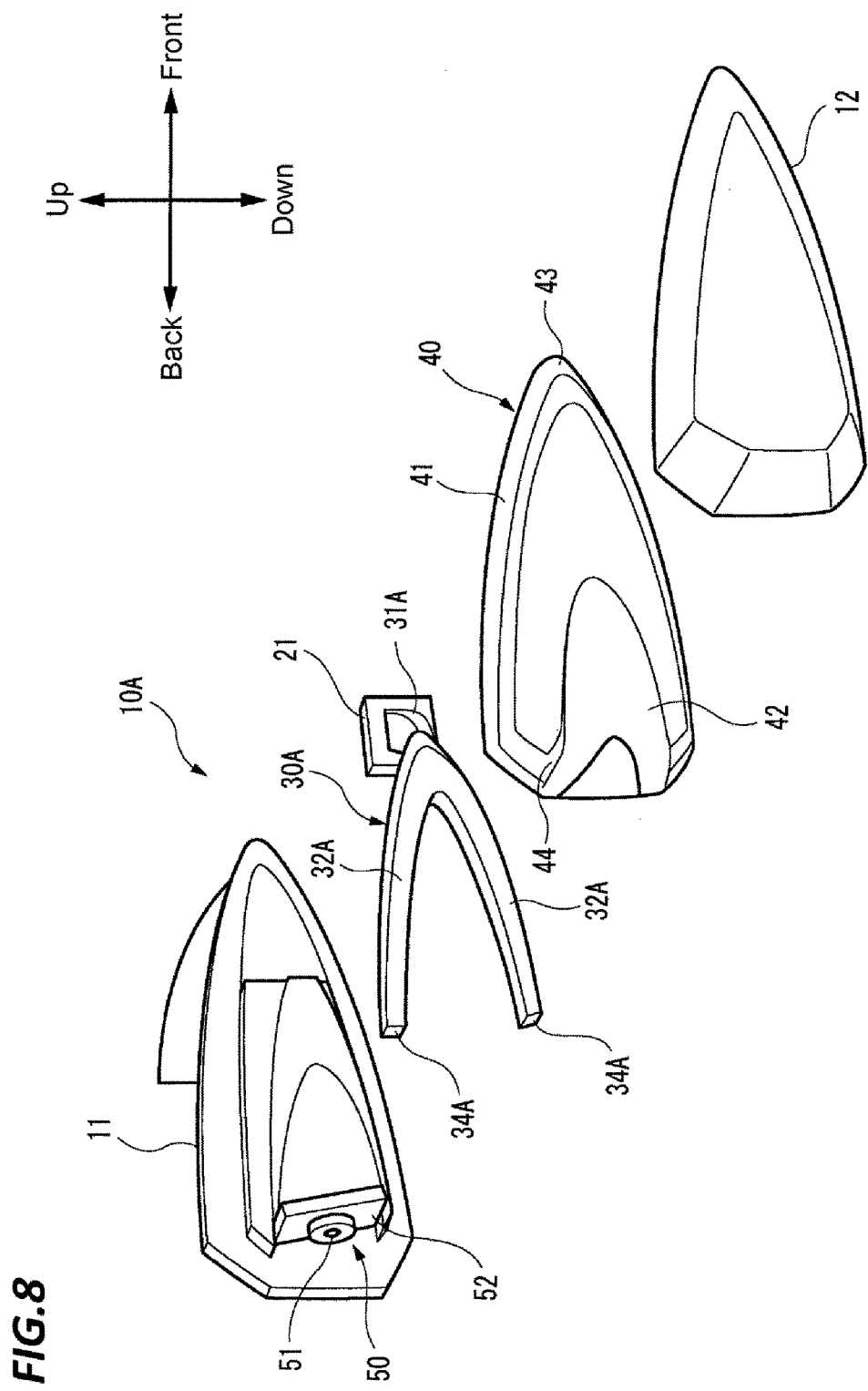
FIG. 8 is an exploded perspective view illustrating a turn signal lamp according to a second exemplary embodiment of the present disclosure.

FIG. 8 is an exploded perspective view of the turn signal lamp 10A according to the second exemplary embodiment of the present disclosure. As illustrated in FIG. 8, the turn signal lamp 10A according to the present exemplary embodiment differ is different from the first exemplary embodiment in terms of the shape of a light guide 30A. The light guide 30A includes no sub light guide portion. The turn signal lamp 10A according to the present exemplary embodiment may allow the main light guide portion 32A to emit light more brightly because the main light guide portion 32A may be brightened by light which would otherwise be used to brighten the sub light guide portion 33 in the turn signal lamp 10 according to the first exemplary embodiment.

Even in the present exemplary embodiment, the light guide 30A is located in the area that extends from the camera 50 in direction following the surface of the front fender 4. Therefore, the increase in aerodynamic drag caused by the turn signal lamp 10A is suppressed while improving the visibility.

Third Exemplary Embodiment

Figure 9:
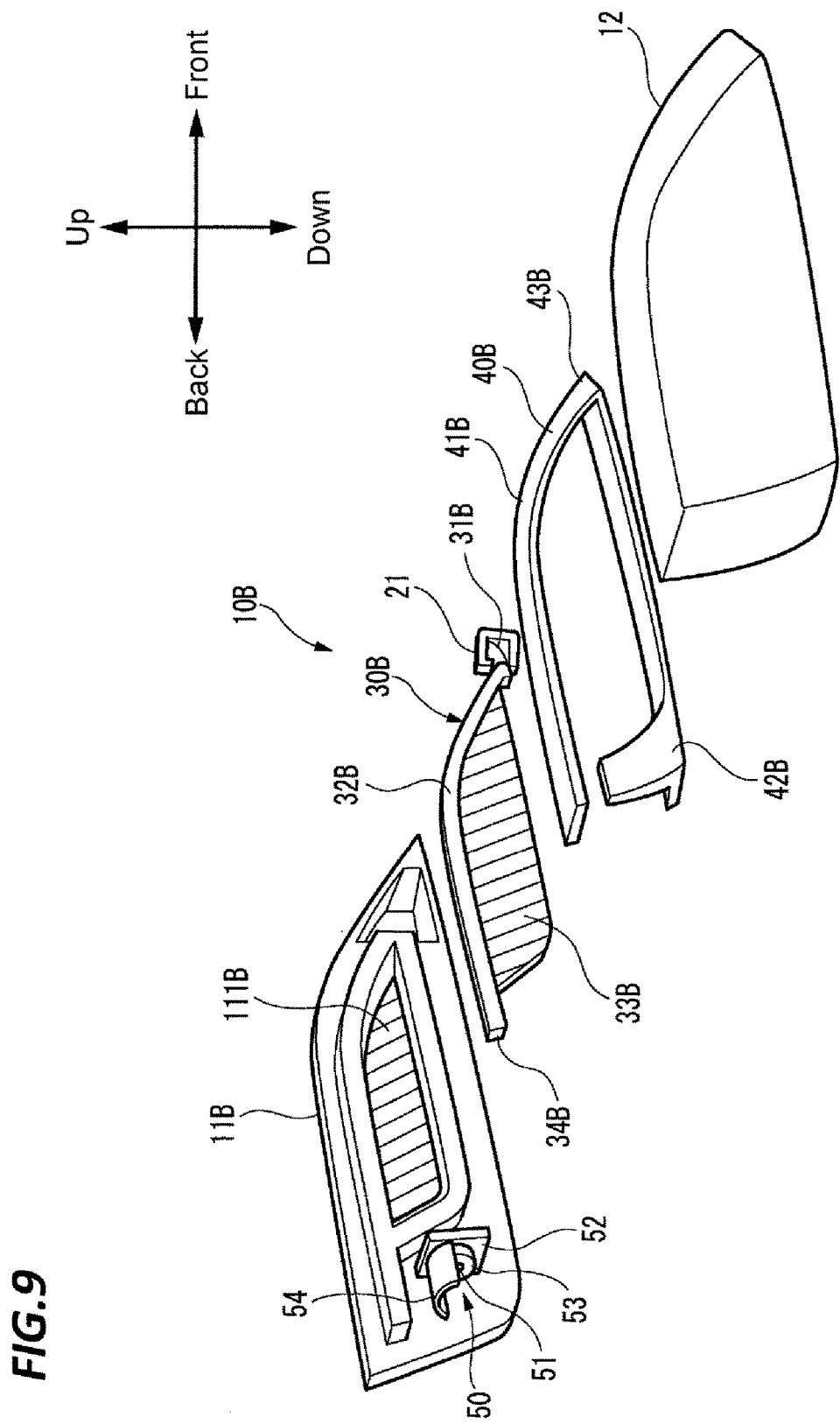
FIG. 9 is an exploded perspective view illustrating a turn signal lamp according to a third exemplary embodiment of the present disclosure.

FIG. 9 is an exploded perspective view of the turn signal lamp 10B according to the third exemplary embodiment of the present disclosure. As illustrated in FIG. 9, the turn signal lamp 10B according to the present exemplary embodiment is different from the first exemplary embodiment in terms of the shape of a lamp body 10B, a light guide 30B, an extension 40B, and the outer cover 12.

The light guide 30B includes an incidence portion 31B, a back end portion 34B located above the camera 50, a main light guide portion 32B, and a sub light guide portion 33B. The main light guide portion 32B is an arcuate portion, and connects the incidence portion 31B and the back end portion 34B to each other in an arcuate shape. The sub light guide portion 33B is a plate-shaped region that extends downward from the main light guide portion 32B. The sub light guide portion 33B is formed with a slit that extends in the up-and-down direction. The thickness of the sub light guide portion 33B in the left-and-right direction is smaller than the thickness of the main light guide portion 32B in the left-and-right direction.

In the present exemplary embodiment, as illustrated in FIG. 9, the camera 50 includes a light shield member 54 formed of an opaque material. The light shield member 54 is installed between the back end portion 34B of the light guide 30B and the image capture device 51. The light shield member 54 is installed in a lens barrel 53 that covers the image capture device 51. The light shield member 54 blocks light emitted from the back end portion 34B and introduced into the image capture device 51. The light shield member 54 may be installed on a support substrate 52 of the camera 50.

Meanwhile, in a case where the back end portions 34A of the light guide 30A are located above and below the image capture device 51 as illustrated in FIG. 8, a cylindrical light shield member configured to surround the image capture device 51 may be used, and light shield members may be installed above and below the image capture device 51, respectively. In addition, three or more light shield members may be provided.

The extension 40B includes a frame portion 41B that has a shape following the outer edge of the lamp body 11B, and a camera cover portion 42B that covers a portion of the camera 50. The camera cover portion 42B shields the support substrate 52 of the camera 50 from the outside and exposes the image capture device 51 backward.

Among the inner surfaces of the lamp body 11B, the surface facing the sub light guide portion 33B of the light guide 30B is formed with a deposited metal film 11B. Light emitted from the sub light guide portion 33B toward the lamp body 11B is reflected by the deposited metal film 11B and is emitted to the outside through the light guide 30B. By this, the efficiency of use of light is increased, and the visibility of the turn signal lamp 10B is improved.

Even in the present exemplary embodiment, the back end portion 34B of the light guide 30B is formed above the camera 50, and the light guide 30B is located in the area that extends from the camera 50 in the direction following the surface of the front fender 4. Therefore, the increase in aerodynamic drag caused by the turn signal lamp 10B is suppressed while improving the visibility.

Fourth Exemplary Embodiment

Figure 10:
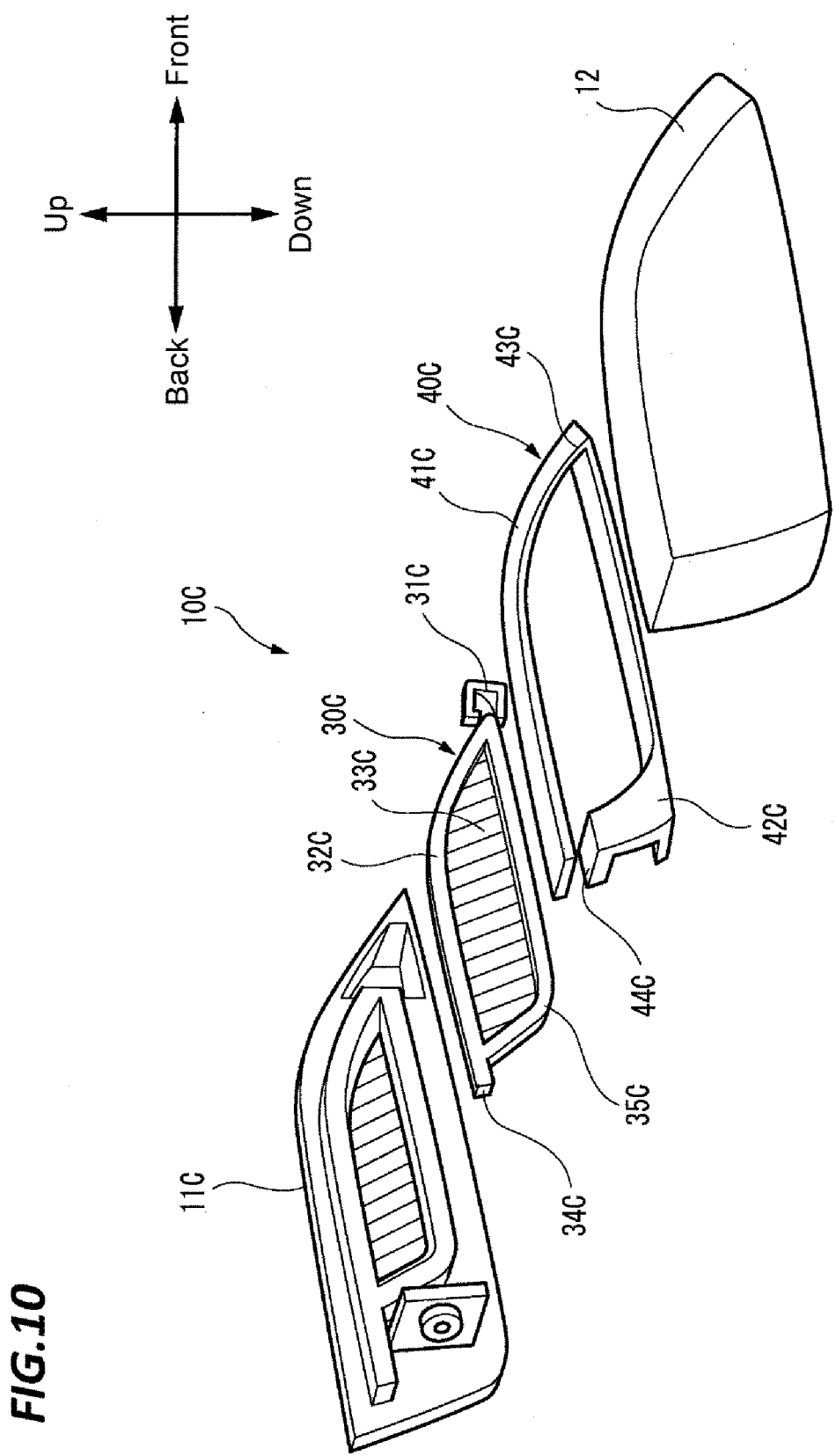
FIG. 10 is an exploded perspective view illustrating a turn signal lamp according to a fourth exemplary embodiment of the present disclosure.

FIG. 10 is an exploded perspective view of the turn signal lamp 10C according to the fourth exemplary embodiment of the present disclosure. As illustrated in FIG. 10, the turn signal lamp 10C according to the present exemplary embodiment is different from the third exemplary embodiment in that the second main light guide portion 35C is formed on the light guide 30C.

The second main light guide portion 35C connects a portion of a main light guide portion 32C at the front of the camera 50 to an incidence portion 31C, and is located below the main light guide portion 32C. A sub light guide portion 33C is formed between the main light guide portion 32C and the second main light guide portion 35C.

Even in the present exemplary embodiment, the back end portion 34C of the light guide 30C is formed above the camera 50, and the light guide 30C is located in the area that extends from the camera 50 in the direction following the surface of the front fender 4. Therefore, the increase in aerodynamic drag caused by the turn signal lamp 10C is suppressed while improving the visibility.

Fifth Exemplary Embodiment

Figure 11:
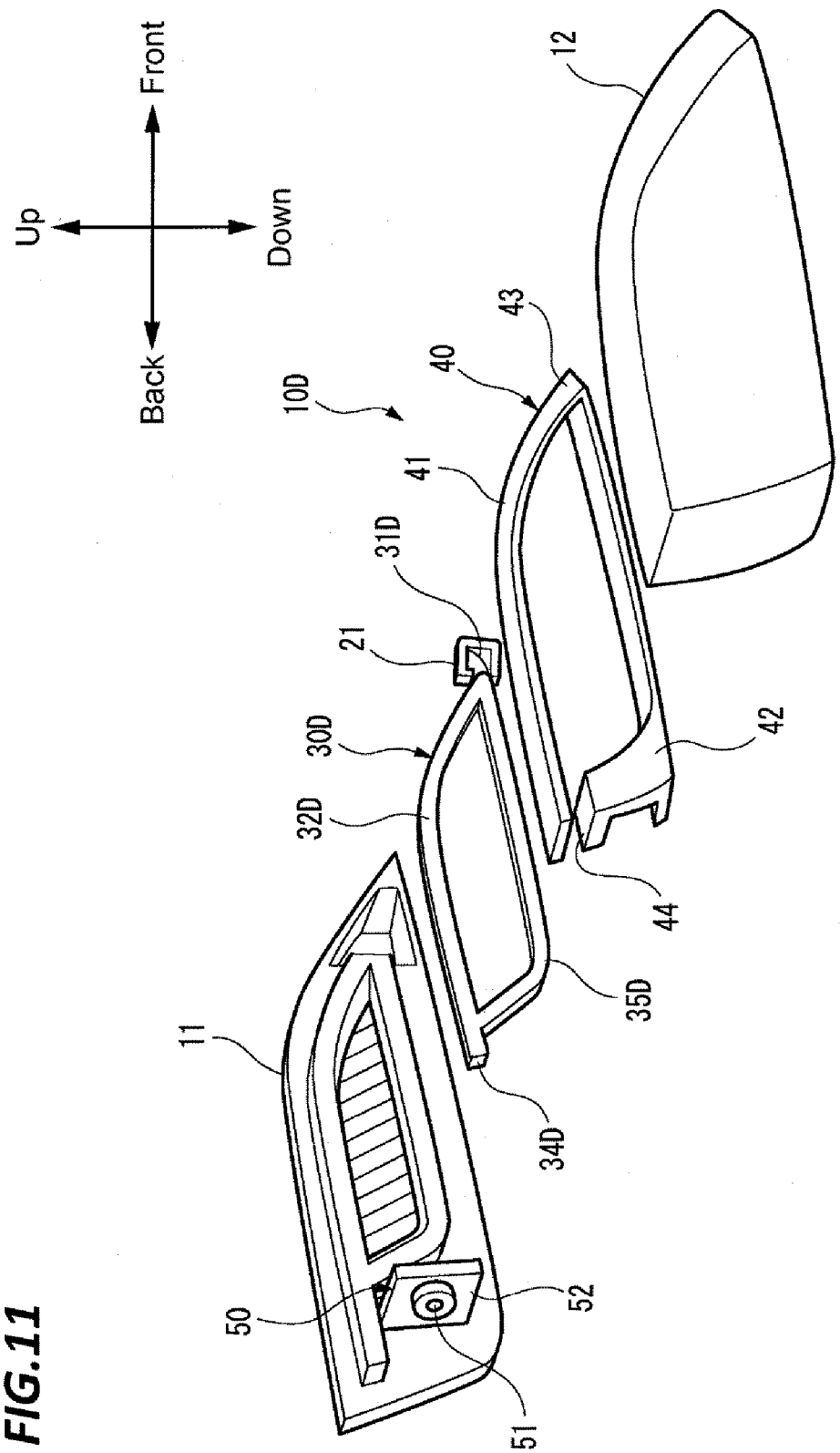
FIG. 11 is an exploded perspective view illustrating a turn signal lamp according to a fifth exemplary embodiment of the present disclosure.

FIG. 11 is an exploded perspective view of the turn signal lamp 10D according to the fifth exemplary embodiment of the present disclosure. As illustrated in FIG. 11, the turn signal lamp 10D according to the present exemplary embodiment is different from the fourth exemplary embodiment in that no sub light guide portion is formed on the light guide 30D. Even in the present exemplary embodiment, the back end portion 34D of the light guide 30D is formed above the camera 50, and the light guide 30D is located in the area that extends from the camera 50 in the direction following the surface of the front fender 4. Therefore, the increase in aerodynamic drag caused by the turn signal lamp 10D is suppressed while improving the visibility.

Sixth Exemplary Embodiment

Figure 12:
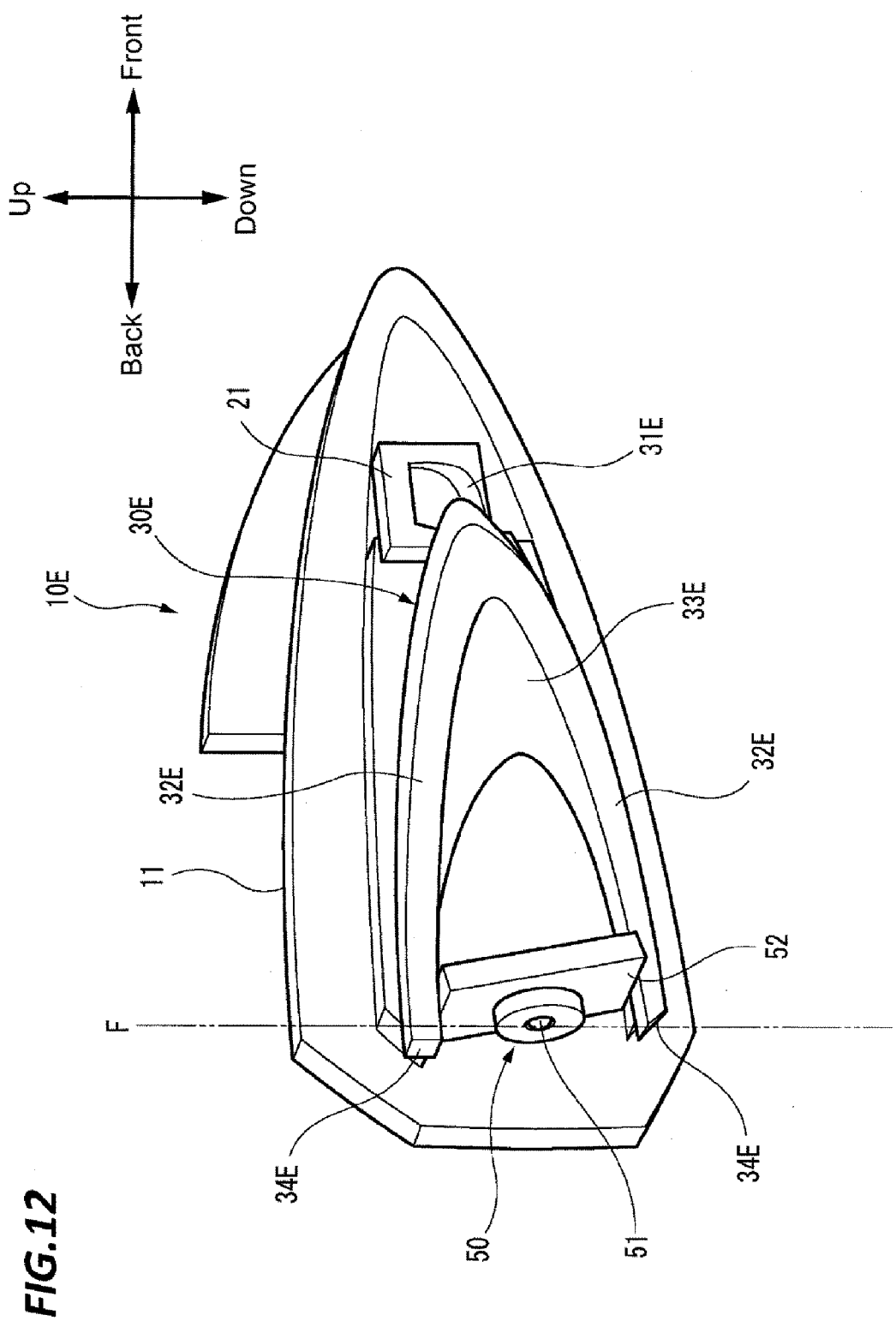
FIG. 12 is a perspective view illustrating a turn signal lamp according to a sixth exemplary embodiment of the present disclosure in a state where an outer cover is removed therefrom.

FIG. 12 is a perspective view illustrating the turn signal lamp 10E according to the sixth exemplary embodiment of the present disclosure in a state where the outer cover and the extension are removed therefrom. In FIG. 12, a virtual line F represents a line that extends in the direction following the surface of the front fender 4 through the image capture device 51 of the camera 50. As illustrated in FIG. 6, an example in which the back end portion 34 of the light guide 30 is located at the front of the back end of the image capture device 51 has been described in the turn signal lamp 10 according to the first exemplary embodiment. However, as illustrated in FIG. 12, the back end portion 34E of the light guide 30E may be located behind the back end of the image capture device 51. Since the camera 50 is accommodated in the space between bifurcate main light guide portions 32E of the light guide 30E, the enlargement of the turn signal lamp including the camera 50 and the light guide 30E is suppressed.

While the respective exemplary embodiments have been described above using, for example, the common outer cover 12 and light source (LED), the shape or relative positional relationship of these members is not limited to the above-described exemplary embodiments.

REFERENCE EXAMPLE

When, for example, a camera, a light source, or a light guide which is brightened by the light source are located within the lamp chamber, light emitted from, for example, the light source or the light guide is introduced into the image capture device of the camera so that the image capture device may not acquire image information well. Thus, the inventors of the present disclosure have contemplated a turn signal lamp 10F according to the following reference example.

Figure 13A:
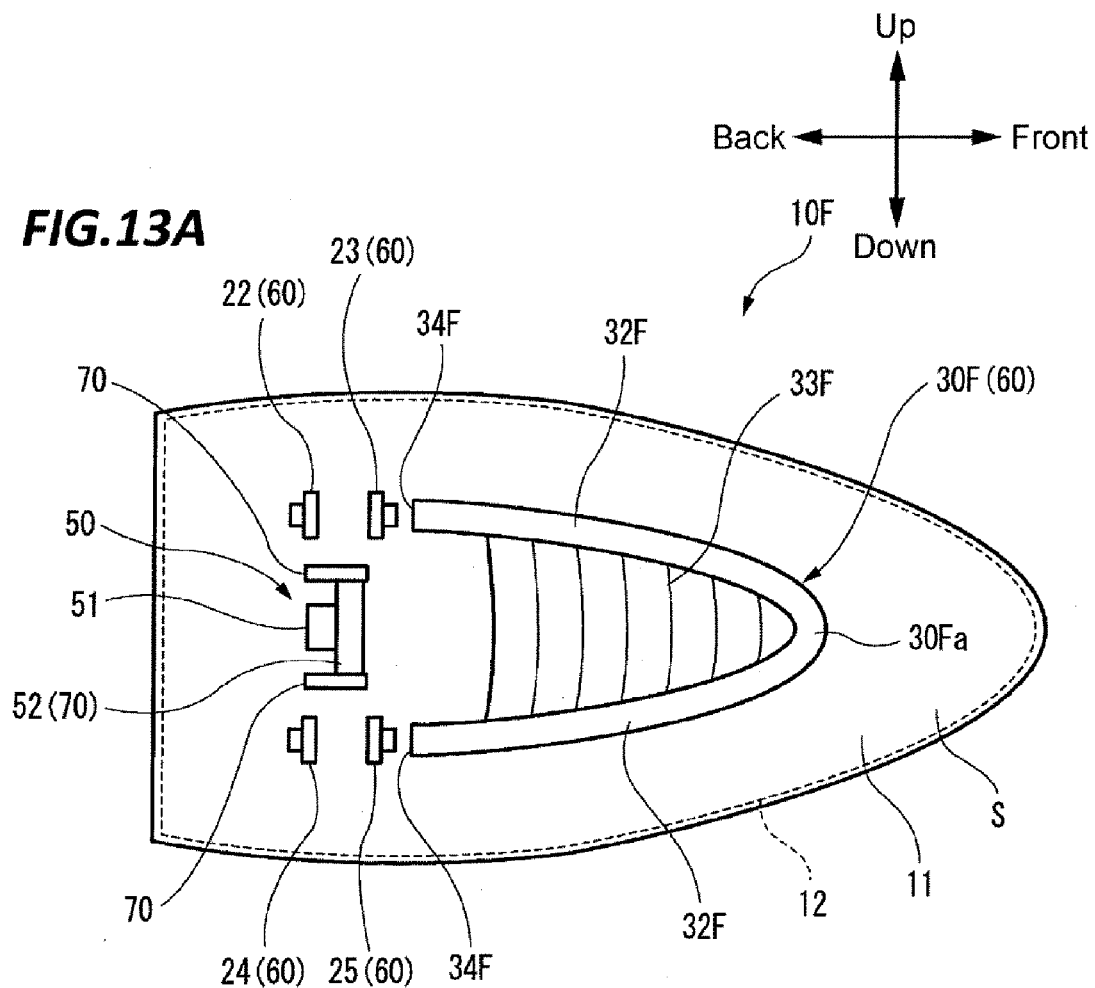
FIGS. 13A and 13B are schematic views illustrating a turn signal lamp according to a reference example of the present disclosure.
Figure 13B:
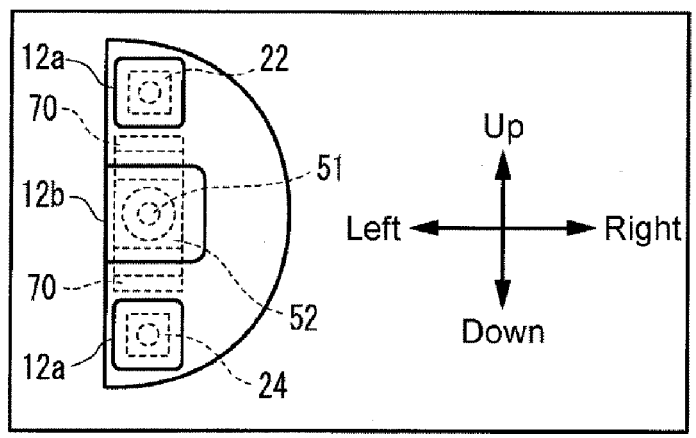

FIGS. 13A and 13B are schematic views illustrating the turn signal lamp 10F according to the reference example of the present disclosure. FIG. 13A is a side view of the turn signal lamp 10F. FIG. 13B is a back view of the turn signal lamp 10F. In the example illustrated in FIGS. 13A and 13B, the vehicle surface, to which the turn signal lamp 10F is attached, extends in the vertical direction.

As illustrated in FIG. 13A, the turn signal lamp 10F according to the present reference example includes a lamp body 11, an outer cover 12, a light emission element 60, an extension 40, a camera 50 having an image capture device 51, and shield members 70. The lamp chamber S is formed by the lamp body 11 and the outer cover 12. The light emission element 60, the extension 40, the camera 50, and the shield members 70 are installed within the lamp chamber S.

In the present reference example, the light emission element 60 has an upper back LED 22, an upper front LED 23, a lower back LED 24, a lower front LED 25, and a light guide 30F. The light guide 30F is an approximately U-shaped transparent resin member. When the turn signal lamp 10F is attached to the vehicle 1, the light guide 30F is installed in front of the four LEDs 22 to 25. The light guide 30F is attached to the lamp body 11 in an orientation in which the bottom portion 30Fa of the latter U is located at the front side. The light guide 30F includes a main light guide portion 32F having a bifurcated shape which is split into upper and lower portions along the outer edge of the letter U, and a sub light guide portion 33F formed between the bifurcated upper and lower portions of the main light guide portion 32F. The thickness of the sub light guide portion 32F in the left-and-right direction is smaller than the thickness of the main light guide portion 32F in the left-and-right direction.

The upper front LED 23 and the lower front LED 25 are attached to the lamp body 11 in an orientation where the upper and lower front LEDs 23, 25 emit light forward. The upper front LED 23 is installed above the camera 50. The lower front LED 25 is installed below the camera 50.

The upper front LED 23 and the lower front LED 25 emit light toward back end portions 34F of the upper and lower main light guide portions 32F, respectively. The light emitted from the upper front LED 23 and the lower front LED 25 and introduced into the back end portions 34F is guided within the main light guide portion 32F and the sub light guide portion 33F, thereby causing the main light guide portion 32F and the sub light guide portion 33F to emit light.

The upper back LED 22 and the lower back LED 24 are attached to the lamp body 11 in an orientation where the upper and lower back LEDs 22, 24 emit light backward. The upper back LED 22 and the lower back LED 24 are installed behind the upper front LED 23 and the lower front LED 25. The upper back LED 22 is installed above the camera 50. The lower back LED 24 is installed below the camera 50. A desired light distribution pattern required by law is formed by light emitted from the upper back LED 22 and the lower back LED 24.

As illustrated in FIG. 13B, step portions 12a and a camera window 12b are formed on the back surface of the outer cover 12. The step portions 12a form a desired light distribution pattern by controlling light emitted from the upper back LED 22 and the lower back LED 24. Instead of the step portions, lens elements may be installed at the positions where the step portions 12a are formed, respectively.

The camera window 12b is formed at a position opposite to the image capture device 51 of the camera 50. The camera window 12b is shaped to allow light to pass therethrough, so as to acquire good image information. Meanwhile, the camera window 12b may be formed in a lens shape in order to allow the image capture device 51 to acquire a desired viewing angle.

Meanwhile, instead of the step portions 12a, inner lenses may be installed in the spaces between the upper back LED 22 and the lower back LED 24 and an inner surface of the outer cover 12. With the inner lenses, a desired light distribution pattern may be formed by controlling the light emitted from the upper back LED 22 and the lower back LED 24.

In addition, fine irregularities such as, for example, wrinkles may be formed in a region of the outer cover 12 through which light directed to the lateral side of the vehicle passes. With the fine irregularities, the light emitted from the sub light guide 33F is diffused and emitted to the lateral side of the vehicle. Thereby, the visibility of the turn signal lamp 10F may be further improved.

In this way, in the turn signal lamp 10F according to the present reference example, a large light emission area is secured by the light guide 30F of the light emission element 60, and a desired light distribution pattern is formed by the upper back LED 22 and the lower back LED 24 of the light emission element 60 so that the visibility is improved.

In the turn signal lamp 10F according to the present reference example, the shield members 70 are installed between the upper back LED 22 of the light emission element 60 and the image capture device 51 and between the lower back LED 24 of the light emission element 60 and the image capture device 51. This suppresses the light emitted from the upper back LED 22 and the lower back LED 24 of the light emission element 60 from being introduced into the image capture device 51. By this, the camera 50 may acquire good back image information.

Meanwhile, in the present reference example, the support substrate 52 of the camera 50 functions as the shield member 70. The support substrate 52 of the camera 50 is installed between the image capture device 51 and the light guide 30F of the light emission element 60. By this, the support substrate 52 suppresses the light emitted from the light guide 30F of the light emission element 60 from being introduced into the image capture device 51.

In addition, in the turn signal lamp 10F according to the present reference example, the image capture device 51 is located behind the back end portion 34F of the light guide 30F. Since at least a portion of the shield member 70 is installed between the light emission element 60 and the image capture device 51, the light emitted from the upper back LED 22 and the lower back LED 24 may be suppressed from being introduced into the image capture device 51, which enables acquisition of good image information.

Meanwhile, even in the first exemplary embodiment described above the support substrate 52 and the image capture device cover portion 44 are installed between the light guide 30 and the image capture device 51, as illustrated in FIGS. 5 to 7. That is, the support substrate 52 and the image capture device cover portion 44 function as shield members to suppress light emitted from the light guide 30 from being introduced into the image capture device 51. In the third exemplary embodiment, the light shield member 54 of the camera 50 functions as a shield member. Even in the turn signal lamps 10A and 10C to 10E according to the second exemplary embodiment and the fourth to sixth exemplary embodiments, the support substrate 52 and the image capture device cover portion 44 function as shield members to suppress the light emitted from the light guide 30 from being introduced into the image capture device 51.

That is, the turn signal lamp according to the present reference example is a turn signal lamp that includes: a lamp body, an outer cover that forms a lamp chamber with the lamp body, a light emission element that is installed within the lamp chamber and includes a light source and a light guide to guide light from the light source, and a camera that includes an image capture device. At least a portion of a shield member is installed between the light emission element and the image capture device to suppress the light emitted from the light emission element from being introduced into the image capture device.

In addition, in the turn signal lamp, the image capture device is located in front of the back end of the light guide when the turn signal lamp is attached to the vehicle.

Meanwhile, while an example in which the turn signal lamp equipped with the camera according to the present exemplary embodiment is mounted on a vehicle, from which a fender mirror or a door mirror is excluded, has been described in the above description, the present disclosure is not limited thereto. The turn signal lamp equipped with the camera according to the present exemplary embodiment may be mounted on a vehicle having a fender mirror or door mirror, and a driver may check the view behind the own vehicle by using both the image information acquired by the camera and the image acquired by the fender mirror or door mirror.

In addition, while an example in which the turn signal lamp is attached to the front fender has been described in the above description, the present disclosure is not limited thereto. For example, the turn signal lamp may be attached to, for example, a bonnet or a front pillar of the vehicle. The vehicle surface, to which the turn signal lamp is attached, may extend in the vertical direction, may extend in a direction inclined in relation to the vertical direction, or may extend in the horizontal direction.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A turn signal lamp comprising:
   a lamp body;
   an outer cover that forms a lamp chamber with the lamp body;
   a light source installed in the lamp chamber;
   a light guide installed in the lamp chamber and configured to guide light emitted from the light source; and
   a camera installed in the lamp chamber and provided with an image capture device,
   wherein, when the turn signal lamp is attached to the vehicle surface, at least a portion of the light guide is formed in an area that extends from the camera in a direction following a vehicle surface.

2. The turn signal lamp of claim 1, wherein the light guide includes:
   a thick portion, at least a portion of which is formed in an area that extends from the camera in the direction following the vehicle surface as well as in at least one of an upward direction and a downward direction when the turn signal lamp is attached to the vehicle; and
   a thin portion, at least a portion of which is formed in an area that extends from the camera in a front-and-back direction, the thin portion being thinner than the thick portion.

3. The turn signal lamp of claim 2, wherein the thick portion and the thin portion are integrally formed with each other.

4. The turn signal lamp of claim 1, further comprising:
   an extension installed in the lamp chamber, and configured to shield at least a portion of an inner surface of the lamp body, the light source, the light guide, or the camera from an outside,
   wherein an image capture device cover portion is provided on the extension to suppress light emitted from the light guide or the light source from being introduced into the image capture device.

5. The turn signal lamp of claim 4, wherein the extension integrally includes a camera cover portion that shields the camera excluding the image capture device from the outside.

6. The turn signal lamp of claim 5, wherein the extension integrally includes a light source cover portion that shields the light source from the outside.

7. The turn signal lamp of claim 4, wherein the extension integrally includes a light source cover portion that shields the light source from the outside.

* * * * *